United States Patent
Niefnecker

(10) Patent No.: US 8,668,796 B2
(45) Date of Patent: Mar. 11, 2014

(54) DRAPING DEVICE FOR TEXTILE SEMI-FINISHED PRODUCTS

(75) Inventor: Dirk Niefnecker, Augsburg (DE)

(73) Assignee: Premium Aerotec GmbH, Augsburg (DE)

( * ) Notice: Subject to any disclaimer, the term of this patent is extended or adjusted under 35 U.S.C. 154(b) by 40 days.

(21) Appl. No.: 13/409,146

(22) Filed: Mar. 1, 2012

(65) Prior Publication Data

US 2012/0222802 A1 Sep. 6, 2012

(30) Foreign Application Priority Data

Mar. 2, 2011 (DE) .......................... 10 2011 012 858

(51) Int. Cl.
- *B29C 53/80* (2006.01)
- *B29C 65/00* (2006.01)
- *B32B 37/00* (2006.01)
- *B32B 43/00* (2006.01)

(52) U.S. Cl.
USPC ............. 156/71; 156/162; 156/163; 156/165; 156/166; 156/229; 156/391; 156/496; 156/543; 156/567; 156/574; 156/577

(58) Field of Classification Search
USPC ........... 156/71, 160–166, 169, 170, 228, 229, 156/391, 433, 494–496, 538, 543, 567, 568, 156/574, 577
See application file for complete search history.

(56) References Cited

U.S. PATENT DOCUMENTS

| | | | |
|---|---|---|---|
| 3,127,167 | A | 3/1964 | Rabinow et al. |
| 7,128,869 | B2 | 10/2006 | Habisreitinger et al. |
| 7,972,457 | B2 | 7/2011 | Schoppmeier et al. |
| 2010/0252179 | A1 | 10/2010 | Schoppmeier et al. |
| 2011/0240213 | A1* | 10/2011 | Barlag et al. .................. 156/243 |

FOREIGN PATENT DOCUMENTS

| | | |
|---|---|---|
| DE | 10035237 C1 | 9/2001 |
| DE | 102008051121 A1 | 4/2010 |
| DE | 102009008329 A1 | 8/2010 |
| EP | 1992456 A2 | 11/2008 |

OTHER PUBLICATIONS

European Patent Office, European Search Report in European Patent Application No. 12 00 1147 (Aug. 28, 2012).
Helbig, R.: Neuartige Multiaxialmaschine zur Herstellung von 3D-Preforms. In:12. Chemnitzer Textiltechnik-Tagung -Innovation mit textilen Strukturen (Tagungsband), 30.09.-01.10.2009, S. 127-128.—ISSN 978-3-9812554-3-0.
German Office Action for Application No. 10 2011 012 858.1 dated Aug. 1, 2013.

* cited by examiner

*Primary Examiner* — Sing P Chan
(74) *Attorney, Agent, or Firm* — Leydig, Voit & Mayer, Ltd.

(57) ABSTRACT

A draping device for draping a two-dimensional textile semi-finished product includes a first rotationally symmetrical body having a first axis of rotation and a peripheral surface which varies along the axis of rotation. A first drive is configured to rotate the first body about the first axis of rotation so as to deform, via the first body, the semi-finished product.

11 Claims, 2 Drawing Sheets

DRAPING DEVICE FOR TEXTILE SEMI-FINISHED PRODUCTS

CROSS-REFERENCE TO PRIOR APPLICATION

Priority is claimed to German Patent Application No. DE 10 2011 012 858.1, filed on Mar. 2, 2011, the entire disclosure of which is hereby incorporated by reference herein.

FIELD

The invention generally relates to the production of components from fibre composite materials and more particularly relates to a draping device for draping two-dimensional textile semi-finished products, an end effector comprising a draping device for laying textile semi-finished products on a curved surface, and the use of a draping device.

BACKGROUND

Two-dimensional textile semi-finished products, in particular in aircraft construction, can be draped by three-dimensional deformation of the semi-finished products, for example by applying the semi-finished products to the planar face of a deformation body and then shaping this deformation body accordingly in order to thereby stretch and/or compress the two-dimensional textile semi-finished products.

A process of this type is thus carried out individually for each component or for each tool and it is not readily possible to automate a pre-draping process. It can also be difficult to achieve the required fibre orientations in this manner.

SUMMARY

In an embodiment, the present invention provides a draping device for draping a two-dimensional textile semi-finished product including a first rotationally symmetrical body having a first axis of rotation and a peripheral surface which varies along the axis of rotation. A first drive is configured to rotate the first body about the first axis of rotation so as to deform, via the first body, the draped semi-finished product.

BRIEF DESCRIPTION OF THE DRAWINGS

The present invention will be described in even greater detail below based on the exemplary figures, which are schematic and not to scale. The invention is not limited to the exemplary embodiments. Other features and advantages of various embodiments of the present invention will become apparent by reading the following detailed description with reference to the attached drawings which illustrate the following.

Where like reference numerals are used in different figures in the following description of the figures, these denote like or similar elements. However, like or similar elements can also be denoted by different reference numerals.

DETAILED DESCRIPTION

Figure 1:
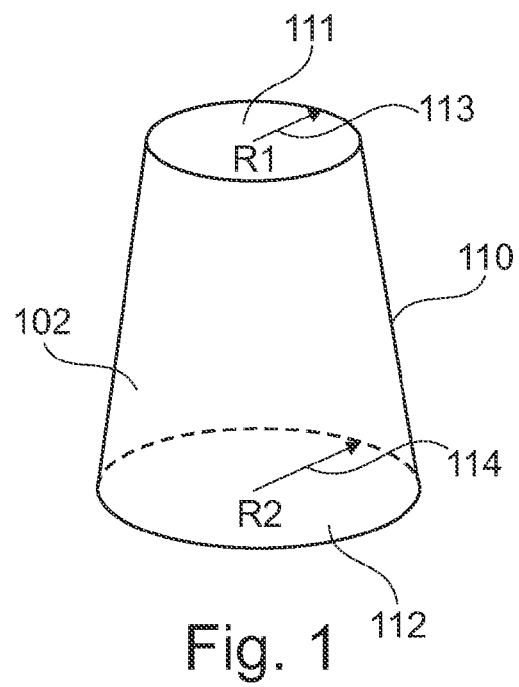
FIG. 1 shows a cone of a draping device according to an embodiment of the invention.

In an embodiment, the invention facilitates rapid and easily manageable draping of two-dimensional textile semi-finished products, such as wovens or non-wovens, by stretching or compression of the semi-finished products.

In an embodiment, the invention provides a draping device for draping two-dimensional textile semi-finished products, an end effector comprising a draping device of this type for applying textile semi-finished products to the surface of a curved tool, and the use of a draping device for producing, or carrying out a sub-process for producing, a former of an aircraft, a pressure bulkhead of an aircraft, a hold door of an aircraft or a fuselage shell of an aircraft. The draping device can also be used for producing skin shells of aircraft, door structures of aircraft and wing structures.

The embodiments described below relate in equal measure to the draping device, the end effector and the uses. In other words, the features which are described below, for example with regard to the draping device, can also be implemented in the end effector and vice versa.

According to an aspect of the invention, a draping device for draping two-dimensional textile semi-finished products is provided. The draping device comprises a first rotationally symmetrical body, for example a cone or frustum, having a first axis of rotation (which is the axis of symmetry of the body), and a first drive for rotating the body about the first axis of rotation. The draping device is designed to deform the two-dimensional textile semi-finished product by means of the first rotationally symmetrical body when the first rotationally symmetrical body (or frustum) rotates about the first axis of rotation and the two-dimensional textile semi-finished product is draped by the draping device.

At this point it should be noted that when a rotationally symmetrical body is mentioned above or below, this can be understood to mean a cone or frustum or another rotationally symmetrical body (for example a paraboloid of revolution or a whole or half hyperboloid of revolution) and vice versa. What is important is merely that this body has an outer surface, the spacing of which from the axis of rotation of this rotationally symmetrical body varies, that is to say for example decreases or increases continuously, along the path from one end of the body to its opposite end. Whether this body is a frustum, a pointed cone, a paraboloid of revolution, a whole or half hyperboloid of revolution or another body of revolution depends on the draping to be achieved.

The first rotationally symmetrical body is thus rotated by the drive and the textile semi-finished product is stretched by the frustum, since said semi-finished product is fed to the rotationally symmetrical body and is then deflected by the rotationally symmetrical body.

In other words, use is made of the arc length difference of the rotationally symmetrical body, which results in a difference between the lengths of the paths which the various regions of the textile semi-finished product must cover when deflected by the rotationally symmetrical body. It must be ensured that the first drive sets the first rotationally symmetrical body in rotation at least indirectly. For example, the first drive may drive the first rotationally symmetrical body directly. It is also possible for this drive to drive another rotationally symmetrical body, for example a cylinder, in which case the other rotationally symmetrical body transmits its rotation to the first rotationally symmetrical body.

This can occur, for example, as a result of the outer surfaces of the two cylinders contacting one another, or the cylinder being connected to the first rotationally symmetrical body in a V-belt type manner.

According to a further aspect of the invention, an end effector is provided which comprises a draping device as described above and below.

According to a further aspect of the invention, the use of a draping device as described above and below for producing a former of an aircraft, a pressure bulkhead of an aircraft, a hold door of an aircraft or a fuselage shell of an aircraft is provided.

Using the draping device, it is possible to drape two-dimensional textile semi-finished products in an automated manner by stretching or compressing the semi-finished products in a plane. This process can take place continuously or sequentially. Pre-draping of non-wovens for former production is thus facilitated. It is also possible, by means of the end effector, continuous laying of non-wovens and/or wovens, to facilitate the draping of the semi-finished products required in the case of three-dimensionally shaped surfaces of the tools or workpieces.

In this context, the term "drape" is to be understood to mean the application of two-dimensional semi-finished products to curved surfaces. The semi-finished products must be stretched and warped for adaptation to the contour. The drapeability of the wovens and non-wovens varies as a function of the type of weave and sewing thereof. Using the draping device, fibre composite materials and so-called prepregs can be processed and fibre composite components, for example for vehicles and in particular for aircraft, can be produced therefrom.

According to an embodiment of the invention, the draping device also comprises a first cylinder having a second axis of rotation (axis of symmetry of the cylinder), it being possible for the second axis of rotation to be arranged parallel to the first axis of rotation of the first rotationally symmetrical body. However, this is not strictly necessary. In this case, the two-dimensional textile semi-finished product is transported and pre-draped, that is to say stretched and/or compressed, by rotation of the first cylinder about the second axis of rotation and rotation of the first rotationally symmetrical body about the first axis of rotation.

According to a further embodiment of the invention, the draping device comprises a resilient circulating membrane which is mounted on the first cylinder and the first rotationally symmetrical body and is used to fix the semi-finished product during transportation thereof by the draping device.

For example, however, it is also possible for the semi-finished product not to be fixed to the draping device by the membrane per se. For example, it is possible for the first cylinder and/or the first rotationally symmetrical body to comprise air holes on the outer surface thereof, via which air holes the two-dimensional textile semi-finished product can be drawn onto the outer surface. For this purpose, corresponding pump devices which generate a vacuum inside the cylinder or the frustum can be provided. For example, it is also possible (alternatively or additionally) for the membrane to comprise air holes and for a suction device to be located on the inner surface of the membrane.

According to a further embodiment of the invention, the draping device comprises a second rotationally symmetrical body having a corresponding axis of rotation, and a second cylinder having a corresponding axis of rotation. The second rotationally symmetrical body (which may also be a further, third cylinder) has an outer surface which is placed against the outer surface of the first rotationally symmetrical body. In other words, the two rotationally symmetrical bodies are arranged directly side by side, in such a way that they squeeze the textile semi-finished product between them.

The outer surfaces of the first cylinder and of the second cylinder also contact one another and the two cylinders are arranged parallel to one another, in such a way that they too squeeze and thus fix the textile semi-finished product during transportation thereof by the draping device.

By utilising the arc length difference of the first rotationally symmetrical body and the resulting path length difference of the membrane tensioned between the first rotationally symmetrical body and the first cylinder, the two-dimensional textile semi-finished products extending between the membrane and a corresponding membrane, which circulates around the second rotationally symmetrical body and the second cylinder, can be stretched or compressed.

According to a further embodiment of the invention, the first rotationally symmetrical body is designed to draw in the semi-finished product during transportation by the draping device. For this purpose, said body comprises, for example, corresponding suction nozzles on the outer surface thereof.

According to a further embodiment of the invention, the first rotationally symmetrical body has a first end radius at its first end and a second, larger end radius at its second end, the first rotationally symmetrical body being designed to adjust the first and/or the second end radius.

In other words, the apex angle of the rotationally symmetrical body can be adjusted as a function of the draping requirement for the semi-finished product.

According to a further embodiment of the invention, this process can be carried out in a fully automated manner.

According to a further embodiment of the invention, the end effector is mounted on a robot or a gantry system for the automated application of the two-dimensional textile semi-finished product to the curved surface.

According to a further embodiment of the invention, the draping device is designed as a robot head of the robot.

According to a further embodiment of the invention, the end effector is designed to produce a former of a vehicle, in particular of an aircraft, a pressure bulkhead of an aircraft, a hold door of a vehicle, in particular of an aircraft, or a fuselage shell of an aircraft.

FIG. 1 shows a rotationally symmetrical body in the form of a frustum 102 of a draping device according to an embodiment of the invention. The frustum 102 comprises a base surface 112 having a relatively large radius 114, an outer surface 110, and a top surface 111 having a smaller radius 113.

The principle of the invention is based on the difference in arc length between the top surface and base surface of the frustum 102.

The arc length difference resulting from the radii 113 (R1) and 114 (R2)

$$(\Delta b = 2\pi \times R2 - 2\pi \times R1)$$

increases linearly over the entire outer surface.

Figure 2:
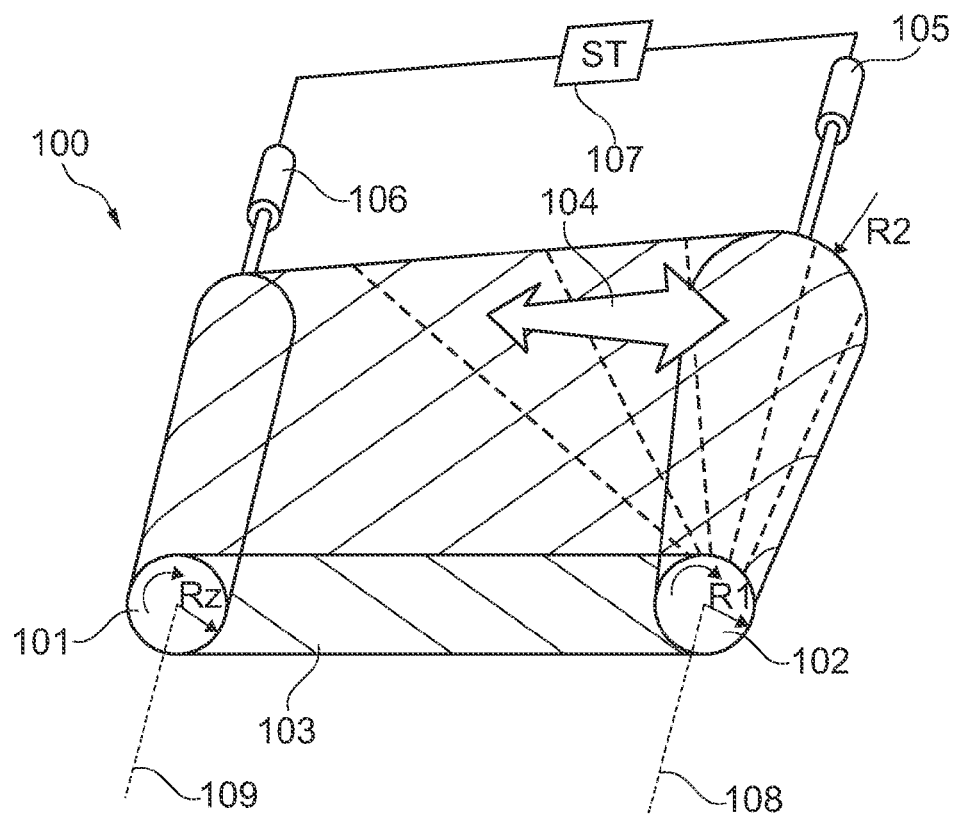
FIG. 2 shows a draping device according to an embodiment of the invention.

FIG. 2 shows a draping device 100 according to an embodiment. The draping device comprises a first cylindrical body 101 and a first frustum 102, the axes of rotation 109, 108 of which are oriented parallel to one another. A resilient membrane 103 is laid around these two bodies 101, 102 and can circulate around the two bodies 101, 102.

If the resilient membrane 103 is tensioned via the cylindrical body 101 and the frustum 102 and this arrangement is constructed in such a way that the cylinder 101 and the frustum 102 can be driven, then when the arrangement moves the membrane is permanently stretched (a prerequisite for this is that R2>Rz (radius of the cylinder 101)) or permanently compressed (prerequisite R2<Rz) in the region 104 (in that it is fed to the frustum 102).

On the underside of the arrangement, the reverse effect occurs (compression when R2>Rz and stretching when R2<Rz).

The cylinder 101 and/or the frustum 102 are each driven and rotated by a corresponding motor 106, 105. The two drives 106, 105 can be controlled via a common control system 107.

The frustum 102 can also be designed in such a way that its apex angle can be varied continuously, for example by increasing or decreasing the radius R2 and/or by increasing or decreasing the radius R1. In the case of this flexible configuration of the radii R1 and/or R2 by mechanical means, it is possible to adapt the compression and stretching of the membrane to requirements during the process.

Figure 3:
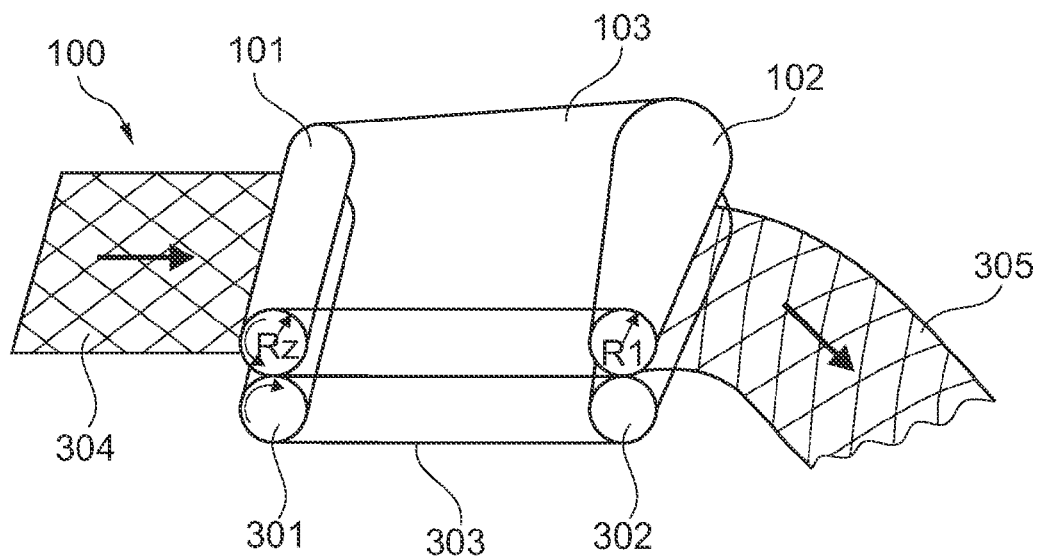
FIG. 3 shows a draping device according to a further embodiment of the invention.

FIG. 3 shows a draping device 100 according to a further embodiment of the invention. In this embodiment, the draping device 100 respectively comprises two cylinders 101, 301 arranged parallel to one another, the outer surfaces of which contact one another and which rotate in opposite directions.

Two adjacent frustums 102, 302 or a frustum 102 and a cylinder 302, the outer surfaces of which also contact one another and which rotate in opposite directions, are arranged at the other end of the draping device. The semi-finished product 304, 305 is squeezed between the two cylinders 101, 301 and between the two frustums 102, 302 in such a way that it is transported by the rotation of the cylinders and frustums.

The two-dimensional textile semi-finished product 304, 305 is fixed, for example by pressing, inside the membrane 103, which circulates around the upper cylinder 101 and the upper frustum 102, and the lower membrane 303, which circulates around the lower cylinder 301 and the lower frustum 302.

The semi-finished product is then deformed within the scope of the possible drapeability of the semi-finished product in accordance with the stretching or compression of the membranes. The type of stretching or compression is determined via the radii Rz, R1 and R2 of the cylinder 101 and the frustum 102. If the radii R1 and R2 are freely adjustable during the process, it is possible to adapt the draping of the semi-finished product 304, 305 to the component production requirements in a continuous process.

Figure 4:
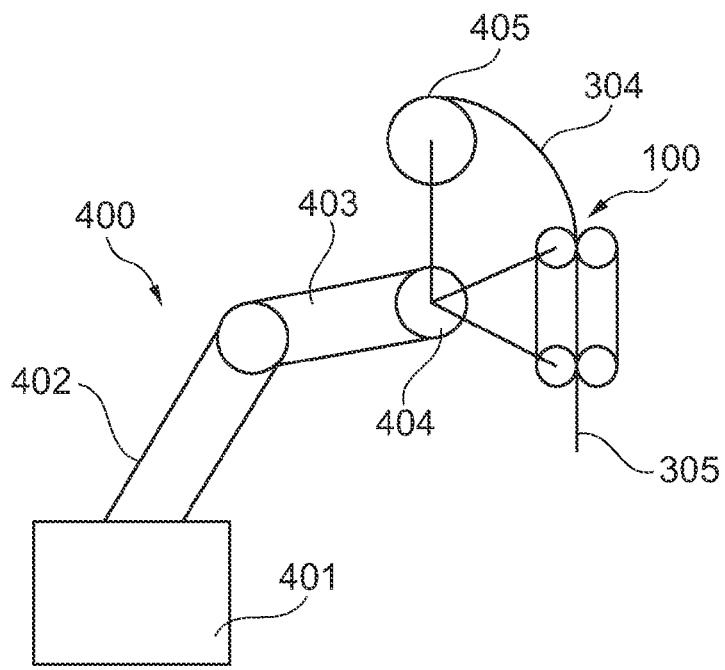
FIG. 4 shows an end effector according to an embodiment of the invention.

FIG. 4 shows an end effector 400 in the form of a robot. The end effector 400 comprises a base 401 to which a first segment 402 of a robot arm is connected. Mounted on the first segment 402 is a second segment 403, on the end 404 of which a draping device 100 is mounted. This draping device 100 is supplied with the two-dimensional textile semi-finished product via a roll 405.

In addition, it should be noted that the terms "including" and "comprising" do not rule out other elements or steps and "a" or "an" does not rule out a plurality. It should also be noted that features or steps which have been described with reference to one of the above-mentioned embodiments can also be used in combination with other features or steps of other above-described embodiments.

What is claimed is:

1. A draping device for draping a two-dimensional textile semi-finished product, the draping device comprising:
a first rotationally symmetrical body having a first axis of rotation and a peripheral surface, wherein a spacing of the peripheral surface from the axis of rotation varies along the axis of rotation;
a first drive configured to rotate the first body about the first axis of rotation so as to deform, via the first body, the semi-finished product.

2. The draping device according to claim 1, further comprising a first cylinder having a second axis of rotation that is parallel to the first axis of rotation and configured to rotate about the second axis of rotation so that the first cylinder and the first body pre-drape and transport the semi-finished product.

3. The draping device according to claim 2, further comprising a resilient circulating membrane disposed on the first cylinder and the first body and configured to fix the semi-finished product during the transport thereof.

4. The draping device according to claim 2, further comprising a second rotationally symmetrical body having a third axis of rotation and a second cylinder having a fourth axis of rotation, the first body and the second body being disposed adjacent to each other with respective outer surfaces of the bodies being in contact with one another and the first cylinder and the second cylinder being disposed adjacent to each other with respective outer surfaces of the bodies being in contact with one another.

5. The draping device according to claim 3, wherein the first body is configured to draw in the semi-finished product during the transport thereof.

6. The draping device according to claim 1, wherein the first body has a first end and a second end opposite the first end, the first end having a first end radius and the second end having a second end radius that is larger than the first end radius, and wherein at least one of the first and second end radius is adjustable.

7. The draping device according to claim 1, wherein the first body is one of a cone and a frustum.

8. A method of using the draping device according to claim 1, the method comprising:
transporting the semi-finished product from a first cylinder having a second axis of rotation to a first rotationally symmetrical body having a first axis of rotation parallel to the second axis of rotation and a peripheral surface which varies along the axis of rotation;
deforming, via the first body and the first cylinder, the semi-finished product; and
applying the semi-finished product to a curved surface so as to produce at least one of a former, a pressure bulkhead, a hold door, a fuselage shell, a skin shell, a door structure and a wing structure of an aircraft.

9. An end effector comprising:
a draping device for draping a two-dimensional textile semi-finished product, the draping device including:
a first rotationally symmetrical body having a first axis of rotation and a peripheral surface, wherein a spacing of the peripheral surface from the axis of rotation varies along the axis of rotation;
a first drive configured to rotate the first body about the first axis of rotation so as to deform, via the first body, the semi-finished product.

10. The end effector according to claim 9, wherein the end effector includes a functional unit of a robot configured to apply the semi-finished product to a curved surface in an automated manner.

11. The end effector according to claim 9, wherein the end effector is configured to produce at least one of a former, a pressure bulkhead, a hold door and a fuselage shell of an aircraft.

* * * * *